United States Patent

[11] 3,587,357

[72] Inventor Frank B. Mercer
       Blackburn, England
[21] Appl. No. 764,200
[22] Filed Oct. 1, 1968
[45] Patented June 28, 1971
[73] Assignee Netlon (P.T.A.) Limited
       Blackburn, Lancashire, England
[32] Priority Oct. 2, 1967
[33] Great Britain
[31] 44,802/67

[54] PLASTICS EXTRUSION DIES AND METHOD OF THEIR MANUFACTURE
1 Claim, 9 Drawing Figs.
[52] U.S. Cl. .................................................. 76/107, 18/8
[51] Int. Cl. ................................................... B21k 5/20
[50] Field of Search ........................................ 76/107 (AS), 107; 18/8 (SS); 29/157 (C)

[56] References Cited
UNITED STATES PATENTS
3,253,301  5/1966  McGlaughlin ................ 18/8

Primary Examiner—Bernard Stickney
Attorney—A. Ralph Snyder

ABSTRACT: A method of manufacturing a complex cross section die for the extrusion of plastics material for the purpose indicated comprising dividing the die section into two components each of which can be formed on a die member face by a milling or like machining operation in or on that face, so forming the two die section components as open ducts on opposing surfaces of a tapering die member portion and in register so that the two component ducts merge at the narrow edge of the tapering die member portion together to form an extrusion die orifice of the desired complex shape, the component ducts being closed on their otherwise open sides by die member portions in contact with the tapering die member portion surfaces.

PATENTED JUN 28 1971 3,587,357

INVENTOR
FRANK BRIAN MERCER
BY
ATTORNEYS

PLASTICS EXTRUSION DIES AND METHOD OF THEIR MANUFACTURE

This invention relates to dies for the extrusion of plastics materials in filamentary form and methods of their manufacture, the dies being for the production of integral (i.e. knotless) nonknitted, plastics net or mesh (hereinafter referred to as "net") by the method, for example, described in British Pat. No. 836,555, and having a complex net strand cross section as shown, for example, in copending British Pat. application No. 49,820/66 as opposed to strands of circular, rectangular or triangular section.

It is an object of the present invention to provide an improved extrusion die construction and method of manufacturing the same which enables the extrusion dies, i.e. the ducts, slots and die orifices, to be formed in the cooperating die lips by the use of conventional milling machines or the like, in spite of the complex character of the dies as described hereinafter, and so making it unnecessary to employ such long and costly processes as spark erosion.

It is a further object of the present invention to provide an improved extrusion die construction having ducts, slots and die orifices of a complex character, which are easy to clean.

The invention consists in a method of manufacturing a complex cross section die for the extrusion of plastics material for the purpose indicated comprising dividing the die section into two components each of which can be formed on a die member face by a milling or like machining operation in or on that face, so forming the two die section components as open ducts on opposing surfaces of a tapering die member portion and in register so that the two component ducts merge at the narrow edge of the tapering die member portion together to form an extrusion die orifice of the desired complex shape, the component ducts being closed on their otherwise open sides by die member portions in contact with the tapering die member portion surfaces.

The invention further consists in a die for the extrusion of integral plastics net having strands of complex section manufactured according to the method of the preceding paragraph.

The manufacture of the die ducts and orifices in the relatively moveable die members for the production of integral plastics net is straightforward for simple cross sections, e.g. circular bores which can be drilled or rectangular slots which can be milled out on the face of the die lips. It may be required, however, to produce net, the strands of which have a complex cross section (e.g. as shown on the left-hand side of FIG. 1 or as described in the aforementioned copending application).

Figure 2:
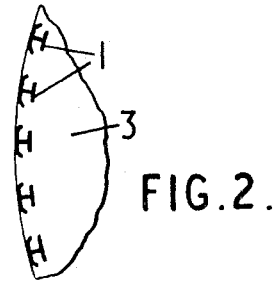
FIG. 2 is a plan view of part of the edge (die lip) of a circular die for the extrusion of plastics net showing, by way of example, the order of size and number of the die ducts for the production, say, of a net suitable for vegetable packaging.

The die ducts and orifices for the extrusion of such complex section strands cannot be manufactured directly by the straightforward methods of drilling and/or milling (slotting) and would require more sophisticated processes such as spark erosion which is time-consuming and costly, particularly where, as is frequent, a large number, say seventy or eighty, identical die ducts and orifices 1 of small size (see FIG. 2) are required to be formed in each of a pair of die lips 3.

Figures 3, 4:
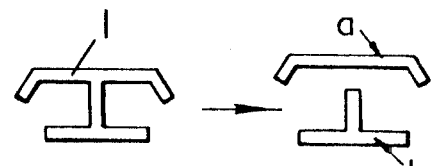
FIG. 3 is an example of a complex die duct construction in cross section.
FIG. 4 is the same die duct construction divided into two simpler components.

According to the invention, a complex section die construction 1 (FIGS. 1 and 3) is divided into two component ducts $a$ and $b$ (FIG. 4 and right-hand side of FIG. 1) each of which can be formed by a straightforward milling or slotting operation.

Figure 5:
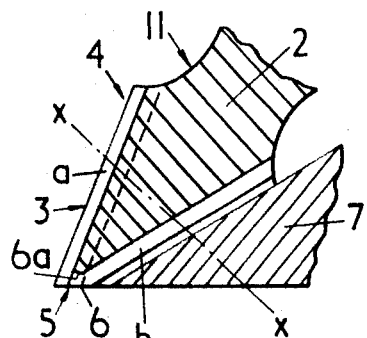
FIG. 5 is a further enlarged detail in radial cross section of the die lip on the right of FIG. 4.
Figure 6:
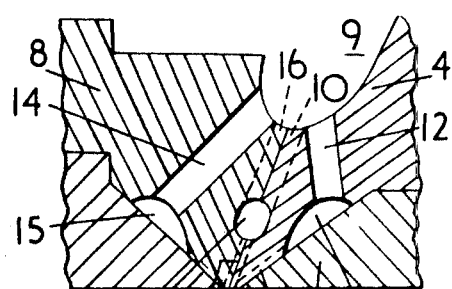
FIG. 6 is a radial cross-sectional detail on an enlarged scale of the cooperating parts of an inner and outer die lip having the die construction according to the present invention.

The component ducts $a$ and $b$ for each die duct and orifice are milled or otherwise formed one on each face of a tapering-section septum 2 (FIG. 5) forming part of the circular die lip 3 of the (inner) die member 4 (see FIG. 6), in precise radial alignment R (see FIG. 7), so that at the narrow edge 5 of the septum 2 the two component ducts $a$ and $b$ merge to form a composite die orifice 6 of the desired section (FIGS. 8 and 9), the duct $b$ being closed by the die lip portion 7. In certain instances it may also be desirable to remove the tip $6a$ of the portion of the septum 2 lying between the ducts $a$ and $b$ where they merge.

When the inner die 4 is assembled with an outer die 8 of similar construction (FIG. 6), plastics material is fed under pressure, in known manner, from an annular supply chamber 9 to the die orifice 6 via a feed duct 10 and annular reservoir 11 through the component duct $a$ and via a feed duct 12 and annular reservoir 13 through the component duct $b$. This is for the inner die 4 and a similar feed is provided for the outer die 8, i.e. from the supply chamber 9 via the supply duct 14 and annular reservoir 15 to the component duct $b$ of the outer die 8 and via the supply duct 16 and annular reservoir 11 to the component duct $a$ of the same outer die 8.

Figure 7:
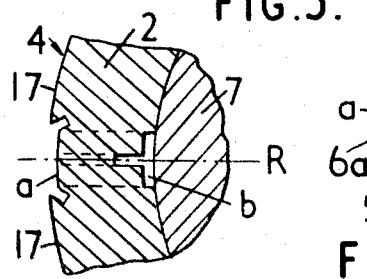
FIG. 7 is a section of the die lip of FIG. 5 taken on the line x-x of FIG. 5.
Figure 8:
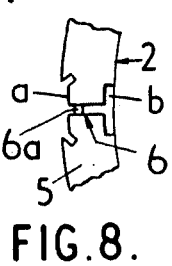
FIG. 8 is an underneath plan view of the die lip shown in FIG. 5.
Figure 9:
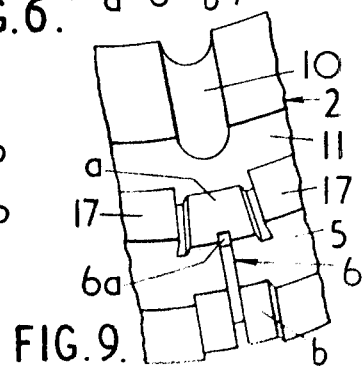
FIG. 9 is an underneath perspective view of the die-bearing part of the die lip construction shown in FIG. 5.

The ducts $a$, except when the die ducts $a$ of the inner and outer die members 4 and 8 are passing through register, will be closed by the surface of the respective outer die lip lying between the ducts $a$ therein, e.g. the surfaces 17 in FIGS. 7 or 9.

Figure 1:
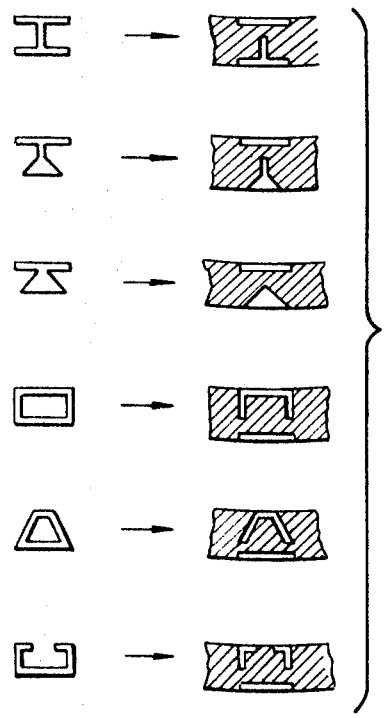
FIG. 1 shows on the left examples of complex die duct construction and on the right the manner of dividing them into pairs of simpler components according to the present invention.

In this manner a complex cross-sectional die construction, as shown for example in FIG. 1, comprises a first die lip component in the form of the septum 2 (FIG. 5) having two inclined faces in one of which the groove duct $a$ is formed as a first die section component and in the other of which the groove duct $b$ is formed as a second die section component, the two ducts $a$ and $b$ intersecting at the narrow edge 5 of the tapering septum 2 (i.e. on the point of the tapering section) to combine and provide the required complex die cross section when the ducts $a$ and $b$ are closed by second and third die member components, viz the outer die 8 itself and the die lip portion 7 of the die 4.

I claim:

1. Method of manufacturing a complex cross section die for the extrusion of plastics material for the purpose indicated, said die having an inner tapering die member, the tapering surfaces of which taper in the direction of, and converge near, the outer die face, said method comprising (a) forming a part of said complex cross section by a milling or like machining operation as an open duct on a tapering die member surface, and (b) forming the remaining part of said complex surface in a like manner as an open duct in the other tapering surface in register with said first duct so that the two component ducts merge at the narrow edge of the tapering die member portion together near the outer die face to form an extrusion die orifice of the desired complex shape, the component ducts being closed on their otherwise open sides by die member portions in contact with the tapering die member portion surfaces.